United States Patent Office 3,022,332
Patented Feb. 20, 1962

3,022,332
PROCESS FOR THE PREPARATION OF UNSATURATED CARBOXYLIC ACID NITRILES
Kurt Sennewald, Knapsack, near Koln, Klaus Born, Hermulheim, near Koln, Heinz Erpenbach, Rodenkirchen, near Koln, and Günther Dobek, Koln, Germany, assignors to Knapsack-Griesheim Aktiengesellschaft, Knapsack, near Koln, Germany, a corporation of Germany
No Drawing. Filed Mar. 17, 1959, Ser. No. 799,860
Claims priority, application Germany Mar. 22, 1958
7 Claims. (Cl. 260—464)

The present invention relates to a process for the preparation of unsaturated carboxylic acids and/or their derivatives; more particularly it relates to the preparation of compounds such as $\alpha,\beta,\gamma,\delta$-unsaturated carboxylic acid nitriles and $\alpha,\beta$-unsaturated carbocyclic cyano compounds.

U.S. Patent No. 2,790,822 provides process for preparing aliphatic $\alpha,\beta$-unsaturated carboxylic acids and/or their derivatives by splitting off water from $\alpha$-hydroxy-carboxylic acids containing at least 3 carbon atoms or from their derivatives containing free $\alpha$-hydroxy-groups. The process is carried out at elevated temperatures, preferably at temperatures within the range of 400° C. to 700° C. in the presence of a catalyst consisting of a hydrous inorganic acid, especially a phosphoric acid, which may be supported on a carrier, the duration of stay being short. The dehydration is brought about by atomizing the mixture consisting of the $\alpha$-hydroxy-carboxylic acids or their derivatives and the hydrous inorganic acids, if desired, in vacuo, into a heated reaction chamber. The dehydration may be carried out in the presence of steam as a diluent. The reaction furnace may be heated from outside or by introducing hot, inert, oxygen-free gases into the interior of the furnace, the gases acting directly on the reaction mixture.

The latter method offers the especial advantage that it can easily be carried out industrially because the hot gases can easily be produced by burning fuels of any kind with a slight deficiency of air or oxygen.

The $\alpha$-hydroxy-carboxylic acids and their derivatives which have hitherto been used are saturated compounds which, apart from the $\alpha$-hydroxy group, do not contain any functional groups. Saturated $\alpha$-hydroxy-carboxylic acid nitriles are particularly suitable for the above-mentioned technique of dehydration. The dehydration of the two saturated $\alpha$-hydroxy-carboxylic acid nitriles, viz. the dehydration of lactic acid nitrile and $\alpha$-hydroxy-valeric acid nitrile which results in the formation of acrylonitrile and $\beta$-ethyl-acrylonitrile respectively, is, for example, carried out accordingly.

Now, we have found that $\alpha$-hydroxy-carboxylic acid nitriles which are extremely sensitive to the increase of temperature and which are unsaturated from the beginning, as well as $\alpha$-hydroxy-carboxylic acid nitriles containing an $\alpha$-hydroxy group and further functional groups, and cyclic cyanohydrins can be dehydrated and converted into the corresponding unsaturated nitriles by heating for a short time with an acid selected from the group consisting of phosphoric acid, pyrophosphoric acid, meta- and polyphosphoric acids containing not more than 6 phosphorous atoms and hydrochloric acid at a temperature of from about 520–700° C., the amount of acid by weight being from 1–90% of the total weight of the reactants. As starting materials there can accordingly also be used compounds whose properties and chemical behaviour are characterized, for example, by the neighbouring position of the cyanohydrin group and the ethylene double bond or which are present in the form of cyclic derivatives.

With regard to their reactivity, the compounds of the first-mentioned group can be compared with acrolein or its cyanohydrin. It is, for example, known that the cyanohydrin of methyl-vinyl-ketone can very easily and in a quantitative yield be rearranged to form levulinic acid nitrile. For this reason, it is inter alia not possible to prepare methyl-vinyl-ketone-cyanohydrin by the methods that are generally applied for the manufacture of the cyanohydrins of saturated aldehydes. The same applies to the preparation of the cyanohydrin of crotonaldehyde. It is also known from the literature that in the aforesaid cases the usual methods yield but sticky resinified masses which according to a nitrogen analysis must have formed by the polymerisation of cyanohydrin that had already been formed and excess aldehyde.

It is also known that the unsaturated $\alpha$-hydroxycarboxylic acid nitriles, the cyanohydrins containing further functional groups and the cyclic cyanohydrins are more sensitive to the increase of temperature than the saturated aliphatic cyanohydrins containing no functional groups beside the $\alpha$-hydroxy group. When the aforesaid substances are heated to about $+100°$ C., occasional rearrangements take place—for example methyl-vinyl-ketone-cyanohydrin is rearranged, as has already been mentioned, to form levulinic acid nitrile—in general, however, the products are even decomposed, said decomposition partially proceeding with the splitting off of HCN and re-formation of the unsaturated carbonyl compounds. These unsaturated substances, for example methyl-vinyl-ketone, polymerize, however, very readily at elevated temperatures and bring about further resinifications.

In view of this state of things, it was not to be foreseen but was surprising that the dehydration of the unsaturated $\alpha$-hydroxy-carboxylic acid nitriles and the $\alpha$-hydroxycarboxylic acid nitriles containing further functional groups, for example acetaldol-cyanohydrin, and the cyclic cyanohydrins would after all be possible at the temperatures necessary for this process, viz. at temperatures within the range of about $+500°$ C. to $+700°$ C., and yield the desired final products.

The mode of operation according to the invention enables also aliphatic $\alpha$-$\beta,\gamma,\delta$-unsaturated carboxylic acids and/or their derivatives to be prepared from the corresponding $\beta,\gamma$-unsaturated or $\gamma,\delta$-unsaturated $\alpha$-hydroxycarboxylic acids or $\alpha$-alkyl-$\alpha,\beta$-dihydroxy-carboxylic acids and $\alpha$-hydroxy-$\gamma$-hydroxy-carboxylic acids and/or their derivatives. For the preparation of 1-cyanobutadiene-(1.3) there may, for example, be used crotonaldehyde cyanohydrin or acetaldol cyanohydrin.

The preparation of nitriles containing several olefinic bonds from unsaturated $\alpha$-hydroxy-nitriles, $\alpha$-alkyl-$\alpha,\beta$-dihydroxy-nitriles or $\alpha,\gamma$-dihydroxynitriles has hitherto only been possible in a complicated way, namely by way of the corresponding acylhydroxy compounds. These compounds are subjected at a temperature within the range of about 500° C. to 600° C. to an ester pyrolysis which yields a mixture of the corresponding acids with the nitrile containing several olefinic bonds. These known processes have the drawback that valuable acylation agents, such as acetic anhydride and acetyl chloride are required for the esterification of the free cyanohydrins and, besides, the separation of the reaction mixture into, for example, acetic acid and 1-cyanobutadiene is difficult. All these disadvantages have been removed by the present invention which enables the aforesaid compounds to be prepared in a much more simple and economic way.

2-cyanobutadiene-(1.3) can now be prepared from methyl-vinyl-ketone-cyanohydrin, acetoin - cyanohydrin and also from the cyanohydrin of 3-keto-butanol-1. For the preparation of 1-cyanocyclohexene-1, there is accordingly used cyclohexanone-cyanohydrin.

The following examples serve to illustrate the invention but they are not intended to limit it thereto.

Example 1

In the manner described in U.S. Patent No. 2,790,822 3.7 m.³ (measured at N.T.P.) per hour of illuminating gas and 13.5 m.³ (at N.T.P.) per hour of air are completely burnt in a combustion chamber lined with brick having an internal diameter of 170 mm. The hot burnt gases which are free from oxygen are cooled to 1120° C. by mixing them with nitrogen. They are then introduced via a distributor ring into the reaction furnace which is lined with firebricks and has an internal width of 260 mm. and a length of 1850 mm. 7.4 kg./h. of a mixture consisting of 59.5% by weight of crotonaldehyde cyanohydrin and 40.5% by weight of phosphoric acid of 78% strength are supplied under a pressure of 65 atmospheres (gauge) through a spraying nozzle at the height of the distributor ring serving for the introduction of the burnt gases. After the burnt gases which have a temperature of 1120° C. are thoroughly mixed with the mist of liquid produced by the atomization, the reaction temperature prevailing at the furnace entrance is within the range of about 560° to 580° C. The duration of stay of the reaction mixture in the furnace amounts to 4.4 seconds. Upon leaving the reaction furnace, the gases are cooled to a temperature within the range of about 20 to 30° C. by directly injecting water. The resulting condensate which contains the phosphoric acid is freed by distillation from the reaction products, part of which was contained in the phosphoric acid, for example cyanobutadiene, hydrocyanic acid and crotonaldehyde, and from the excess of water. The phosphoric acid of about 80% strength obtained in the course of this process is mixed with fresh crotonaldehyde cyanohydrin for the purpose of being again used in the reaction furnace and it is then used again. After elimination of the above-mentioned condensate, the cooled reaction gases which contain 1-cyanobutadiene-(1.3), hydrocyanic acid and crotonaldehyde are washed with water in order to isolate the aforesaid constituents. Upon working up the wash water by distillation, 2.02 kg./h. of 1-cyanobutadiene-(1.3) are obtained in admixture with 0.43 kg./h. of hydrocyanic acid and 1.11 kg./h. of crotonaldehyde. The quantity of crotonaldehyde cyanohydrin that has been converted into 1-cyanobutadiene-(1.3) after having once passed the reaction furnace amounts to 56.3%. Since the recovered portions of hydrocyanic acid and crotonaldehyde can easily be converted into crotonaldehyde cyanohydrin which may be re-cycled, the total yield of 1-cyanobutadiene-(1.3) amounts to 87.2% calculated on the total quantity of crotonaldehyde cyanohydrin that has been used as starting material and consumed.

Example 2

In an empty tube of refined steel which has a length of 1850 mm. and an internal diamter of 180 mm. and is heated electrically to a wall temperature of 680° C., 285 kg./h. of a mixture consisting of 64.0% by weight of acetaldol cyanohydrin and 36.0% by weight of phosphoric acid of 84.5% strength are atomised under a pressure of 125 mm. of mercury by means of an eddy current nozzle run per hour with 0.8 kg. of steam at 270° C. After a duration of stay of 3.8 seconds, the gases leaving the reaction tube are cooled to 25° C. by indirect cooling and the aqueous phosphoric acid is separated therefrom. The residual gases consisting of 1-cyanobutadiene-(1.3), hydrocyanic acid and crotonaldehyde and freed in the above manner from phosphoric acid and the excess of steam are then washed with water, while still under a reduced pressure, in a washing tower filled with Raschig rings. Upon working up the wash water by distillation 0.67 kg. of 1-cyanobutadiene-(1.3), 0.15 kg. of hydrocyanic acid and 0.39 kg. of crotonaldehyde were obtained, the small quantities of the products which on account of their solubility remain in the condensate containing the phosphoric acid, which is obtained at the outlet of the furnace being included in the aforesaid figures. This corresponds to a yield of 53.6% of 1-cyanobutadiene-(1.3) obtained by the conversion of acetaldol-cyanohydrin. Since the recovered portions of hydrocyanic acid and the crotonaldehyde that has formed from the aldol can easily be reacted to yield crotonaldehyde cyanohydrin and be used again, the total yield of 1-cyanobutadiene-(1.3) amounts to 84.3%, calculated on the total amount of acetaldol cyanohydrin used as starting material and consumed. The recovered crotonaldehyde cyanohydrin can be used again either alone or in admixture with acetaldol cyanohydrin and it can also be converted into cyanobutadiene.

Example 3

This experiment is carried out in the apparatus described in Example 1. A mixture consisting of 58.6% by weight of methylvinyl-ketone-cyanohydrin and 41.4% by weight of phosphoric acid of 83% strength is used. The duration of stay is about 1.7 seconds and the reaction temperature is 550° C. 2-cyanobutadiene-(1.3) is obtained in a total yield of 69.5%, calculated on the total quantity of methylvinyl-ketone-cyanohydrin used as starting material and consumed. The quantity of starting material that has undergone conversion after having once passed the reaction furnace is 42.3%.

Example 4

When operating in the manner described in Example 1 and using a mixture consisting of 65.1% by weight of cyclohexanon-cyanohydrin and 34.9% by weight of phosphoric acid of 78% strength, the duration of stay being 1.1 seconds and the reaction temperature being about 605° C., the 1-cyanocyclohexene-1 is obtained in a total yield of 73.7%, calculated on the total quantity of cyclohexanone-cyanohydrin used as starting material and consumed. The quantity of starting material that has undergone conversion after having once passed the reaction furnace amounts to 39.1%.

We claim:

1. A process for producing a compound selected from the group consisting of $\alpha,\beta,\gamma,\delta$-unsaturated carboxylic acid nitriles and $\alpha,\beta$-unsaturated carbocyclic cyano compounds which comprises heating a substance selected from the group consisting of crotonaldehydecyanohydrin, acetaldolcyanohydrin, methylvinylketonecyanohydrin, acetoincyanhydrin, 3-keto-butan-1-ol-cyanohydrin and cyclohexanon cyanohydrin with an acid selected from the group consisting of phosphoric acid, pyrophosphoric acid, meta- and polyphosphoric acids containing not more than 6 phosphorus atoms and hydrochloric acid at a temperature of from about 520°–700° C., the amount of acid by weight being from 1–90% of the total weight of the reactants.

2. The process of claim 1 including the step of diluting the reactants with inert gases free from oxygen.

3. The process of claim 1 wherein the acid is in aqueous solution.

4. The process of claim 1 wherein the temperature is from about 580° C. to 700° C. and the acid compound is in aqueous solution and present in an amount of 20 to 40% by weight of the reactants.

5. The process of claim 1 wherein the initial compound and the selected acid is blown as a finely divided reaction mixture into a reaction zone.

6. The process of claim 5 wherein a hot, inert gas free from oxygen heats the finely divided reaction mixture in the reaction zone.

7. The process of claim 1 wherein the selected acid is in the gaseous state.

References Cited in the file of this patent

UNITED STATES PATENTS 2,790,822     Wolfram et al. _____ Apr. 30, 1957